(12) United States Patent
Szczepanik et al.

(10) Patent No.: US 12,248,538 B2
(45) Date of Patent: Mar. 11, 2025

(54) LICENSE SCAN TRIGGERING SYSTEM

(71) Applicant: International Business Machines Corporation, Armonk, NY (US)

(72) Inventors: Grzegorz Piotr Szczepanik, Cracow (PL); Piotr Kalandyk, Zielonki (PL); Lukasz Jakub Palus, Cracow (PL); Pawel Tadeusz Januszek, Cracow (PL); Hubert Kompanowski, Izbica Kujawska (PL)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 17/175,310

(22) Filed: Feb. 12, 2021

(65) Prior Publication Data

US 2022/0261459 A1 Aug. 18, 2022

(51) Int. Cl.
*G06F 21/10* (2013.01)
*G06F 21/56* (2013.01)
*G06N 5/04* (2023.01)
*G06N 20/00* (2019.01)

(52) U.S. Cl.
CPC .......... *G06F 21/105* (2013.01); *G06F 21/564* (2013.01); *G06N 5/04* (2013.01); *G06N 20/00* (2019.01); *G06F 21/1077* (2023.08); *G06F 2221/033* (2013.01)

(58) Field of Classification Search
CPC .................................................. G06F 21/105
See application file for complete search history.

(56) References Cited

U.S. PATENT DOCUMENTS

| | | | |
|---|---|---|---|
| 6,189,146 B1 | 2/2001 | Misra | |
| 7,734,945 B1* | 6/2010 | Levidow | G06F 11/0793 |
| | | | 714/3 |
| 7,818,741 B1 | 10/2010 | Bourdev | |
| 8,407,669 B2 | 3/2013 | Yee | |
| 9,396,311 B2 | 7/2016 | Kacin | |
| 2002/0129329 A1* | 9/2002 | Nishioka | G06F 11/3457 |
| | | | 714/E11.204 |
| 2004/0003131 A1* | 1/2004 | Curtis | G06F 11/328 |
| | | | 719/318 |
| 2015/0074055 A1* | 3/2015 | Jacoby | G06F 11/0778 |
| | | | 707/639 |
| 2018/0062970 A1* | 3/2018 | Abzakh | H04L 43/10 |
| 2019/0250893 A1* | 8/2019 | Pandit | G06N 20/00 |
| 2020/0394455 A1* | 12/2020 | Lee | G06Q 40/08 |

(Continued)

OTHER PUBLICATIONS

Software License Management, https://www.manageengine.com/products/service-desk/it-asset-management/software-license-tracking.html.

(Continued)

*Primary Examiner* — Simon P Kanaan
(74) *Attorney, Agent, or Firm* — Daniel M. Yeates

(57) ABSTRACT

A method, system and computer program product for lightweight software license compliance management. One embodiment of the method comprises accessing a set of software logs from a target device, analyzing the set of software logs to generate a license violation probability score, determining the license violation probability score satisfies a predetermined threshold, and notifying a user of a need to scan the target device for software license compliance.

14 Claims, 6 Drawing Sheets

(56) References Cited

U.S. PATENT DOCUMENTS

2022/0261459 A1* 8/2022 Szczepanik .......... G06F 21/552

OTHER PUBLICATIONS

TADDM overview, Tivoli Application Dependence Discovery Manager 7.3.0, printed Feb. 8, 2021, https://www.ibm.com/support/knowledgecenter/en/SSPLFC_7.3.0/com.ibm.taddm.doc_7.3/AdminGuide/c_cmdb_overview.html.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

LICENSE SCAN TRIGGERING SYSTEM

BACKGROUND

The present disclosure relates to information technology tools, and more specifically, to a light-weight software license compliance management tool.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

Today's computing infrastructure is frequently organized into clouds. Cloud computing, in turn, generally refers to on-demand access, via the internet, to computing resources, such as applications, servers (physical servers and virtual servers), data storage, development tools, and networking capabilities hosted at a data center managed by a cloud services provider (or CSP). The CSP, which may be another organization or another entity within the same organization, makes these resources available for a monthly subscription fee or bills them according to usage.

Virtualization enables CSPs to make maximum use of their data center resources. Not surprisingly, many corporations have adopted the cloud delivery model for their on-premises infrastructure, so that they can realize increased utilization and cost savings as compared to traditional infrastructure systems.

SUMMARY

According to embodiments of the present disclosure, a method for light-weight software license compliance management. One embodiment of the method comprises accessing a set of software logs from a target device, analyzing the set of software logs to generate a license violation probability score, determining the license violation probability score satisfies a predetermined threshold, and notifying a user of a need to scan the target device for software license compliance.

According to embodiments of the present disclosure, a computer program product for light-weight software license compliance management. One embodiment of the computer program product comprises a computer readable storage medium having program instructions embodied therewith. The program instructions are executable by a processor to cause the processor to access a set of software logs from a target device, analyze the set of software logs to generate a license violation probability score, train a machine learning model to identify possible license violations using a plurality of paired license scan results and the set of software logs; determine the license violation probability score satisfies a predetermined threshold, notify a user of a need to scan the target device for software license compliance, and scan the target device for software license compliance in response to the notifying. The set of software logs may be pre-generated by one or more pre-installed applications on the target device, and wherein the set of software logs comprise a set of software change logs. The analyzing may comprise inputting the set of software change logs into the machine learning model.

According to embodiments of the present disclosure, a system for light-weight software license compliance management. The system in one embodiment comprises a processor configured to execute instructions that, when executed on the processor, cause the processor to access a set of software logs from a target device, analyze the set of software logs to generate a license violation probability score, determine the license violation probability score satisfies a predetermined threshold, and notify a user of a need to scan the target device for software license compliance.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
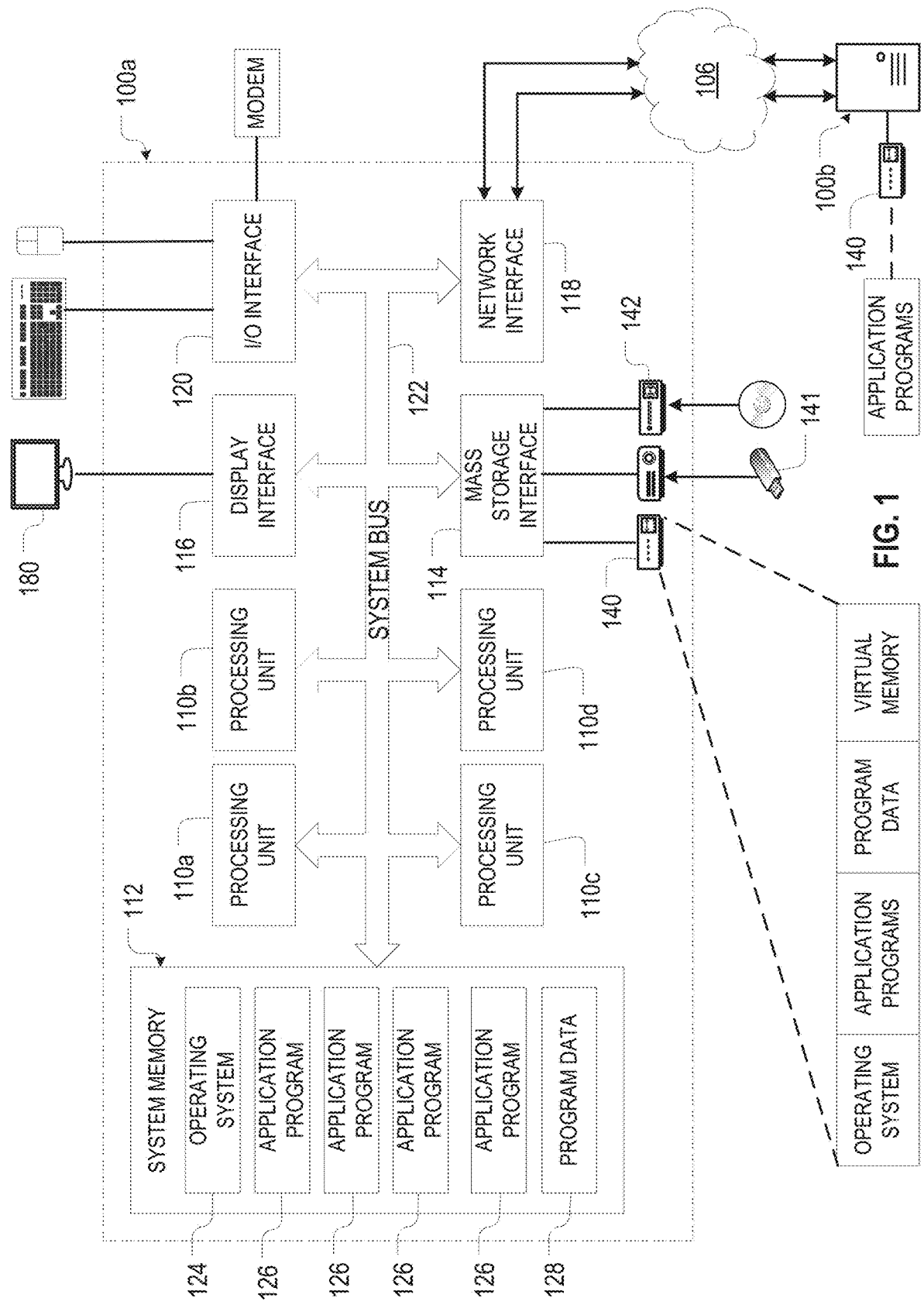
FIG. 1 illustrates an embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to information technology tools; more particular aspects relate to a light-weight software license compliance management tool. While the present disclosure is not necessarily limited to such applications, various aspects of the disclosure may be appreciated through a discussion of various examples using this context.

Today's computing infrastructure is becoming more and more virtualized, and, as a result, creating new virtual machines has become increasingly dynamic. In some environments, this trend may lead to problems with not having proper monitoring for licensing purposes in place. For example, in some situations, the person installing the new software may not be aware of all of its licensing restrictions, including particular uses of the software, configurations, or usage patterns that may result in a breach of those restrictions.

Disclosed herein is a system generating hints about installing software that potentially needs monitoring for licensing purposes and would require a regular license scan run against this system. To this end, the system might use the data collected from the monitoring software already installed on the system (e.g., antivirus monitoring software, intrusion detection software, infrastructure monitoring software, etc.) that monitors the system anyway and that gather information on the actions performed on the system. If those actions indicate installation of new software, a notification is generated that suggests running a full scan against the system if it is license compliant. The notification might be displayed to the user, but might also be sent directly to an administrator who is responsible for overseeing the license compliance.

Accordingly, some embodiments may provide a license scanning and monitoring system that does not require frequent resource-expensive and performance-impacting scans. A feature and advantage of some embodiments is that a risk of license policy breach may be significantly decreased because, whenever a software product or hardware resources that might require a license is installed and/or enabled, a scan may be automatically triggered that would detect potential problems. As a result, there may be a greatly reduced period between scan(s) during which the system might not be complaint and for which there may be penalties and fines. Another feature and advantage of some embodiments is that they may not require another resource intensive, and thus often disliked, scanning process.

Some embodiments may comprise two modules: a possible breach detection module and a notification module. The possible breach detection module may have access to the logs of an existing (e.g., installed for a different primary purpose) monitoring software, such as antivirus software, an intrusion detection system (IDS), etc. By analyzing the output logs of the monitoring software, some embodiments may detect actions performed on the system that indicate new software installations or different use patterns of existing software (e.g., new directories created in the "/opt" directory, files created in the "C:/program files" directory, new users created, etc.) In operation, the detection module in some embodiments may detect potential risks, but will not perform a precise analysis to determine if the software and/or hardware in fact requires licensing. Advantages of these embodiments may include simplicity and lightness (e.g., less impact on the scanned system). The precise detection may still be performed while running a regular scan. The notification module, in turn, may send a notification to the user and/or administrator that a license scan should be performed on a given system to: (i) detect license usage or precisely discover (e. g. product, component, and/or version) used license software if, for example, the license terms require metering; and/or (ii) detect license breaches.

DATA PROCESSING SYSTEM

FIG. 1 illustrates an embodiment of a data processing system (DPS) 300, consistent with some embodiments. The DPS 300 in this embodiment may be implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

Figure 3:
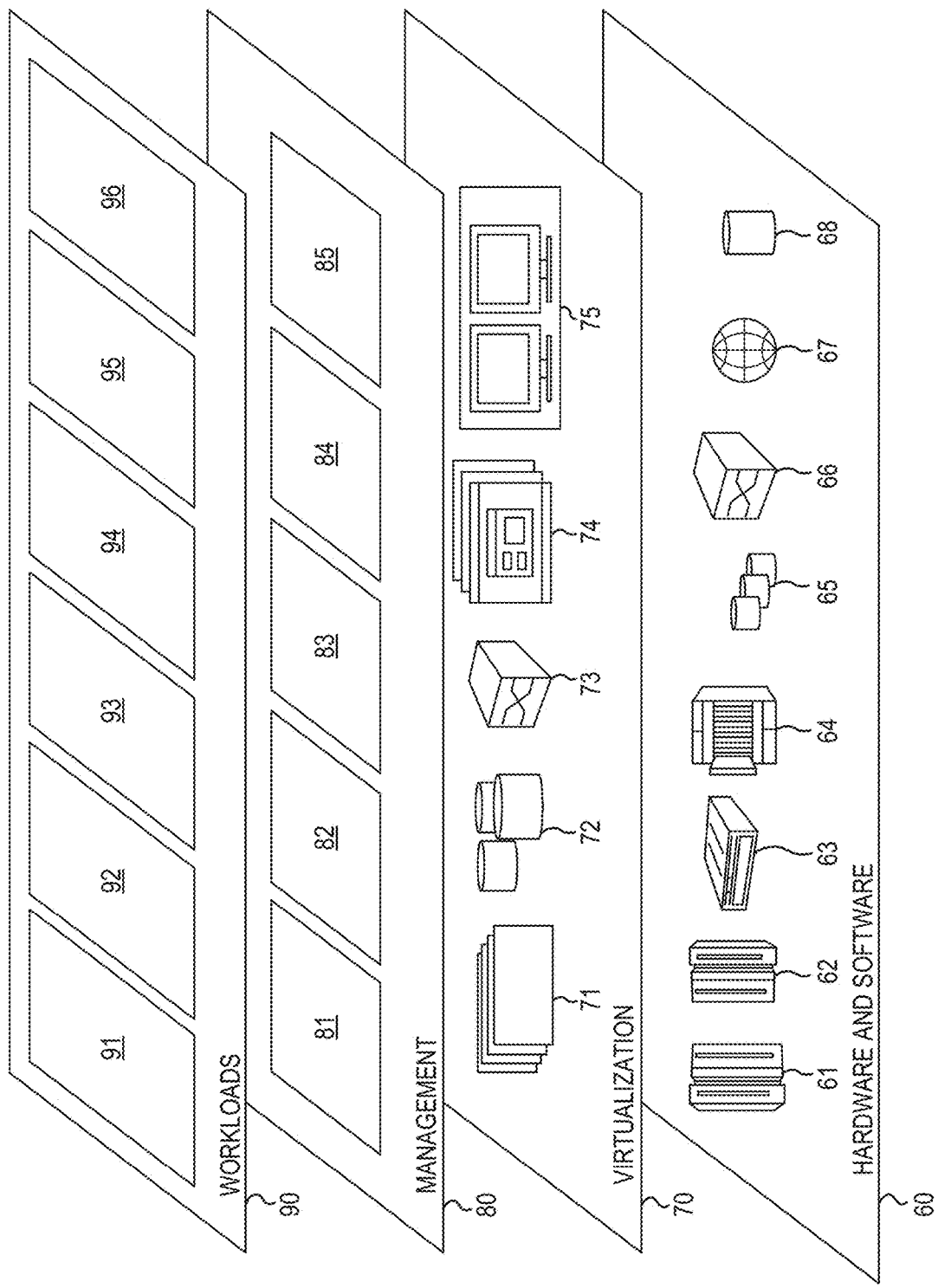
FIG. 3 depicts abstraction model layers, consistent with some embodiments.

The data processing system 300 in FIG. 3 comprises a plurality of central processing units 310a-310d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340, universal serial bus ("USB") storage device 341, or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multi-processor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 341, 342, which are in communication with the processors 310 through the system bus 322. The program code in the different embodiments may be embodied on different physical or tangible computer readable media, such as the system memory 312 or the mass storage devices 340, 341, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 341, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 341, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interfaces 314, 316, 318, 320 support communication with a variety of storage and I/O devices. The mass storage interface 314 supports the attachment of one or more mass storage devices 340, 341, 342, which are typically rotating magnetic disk drive storage devices, a solid-state storage device (SSD) that uses integrated circuit assemblies as memory to store data persistently, typically using flash memory, or a combination of the two. However, the mass storage devices 340, 341, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units, such as monitor 380, to the data processing system 300. These display units 380 may be non-intelligent (i.e., dumb) terminals, such as an LED monitor, or may themselves be fully programmable workstations used to allow IT administrators and customers to communicate with the DPS 300. Note, however, that while the display interface 316 is provided to support communication with one or more display units 380, the computer systems 300 does not necessarily require a display unit 380 because all needed interaction with customers and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

CLOUD COMPUTING

Figure 2:
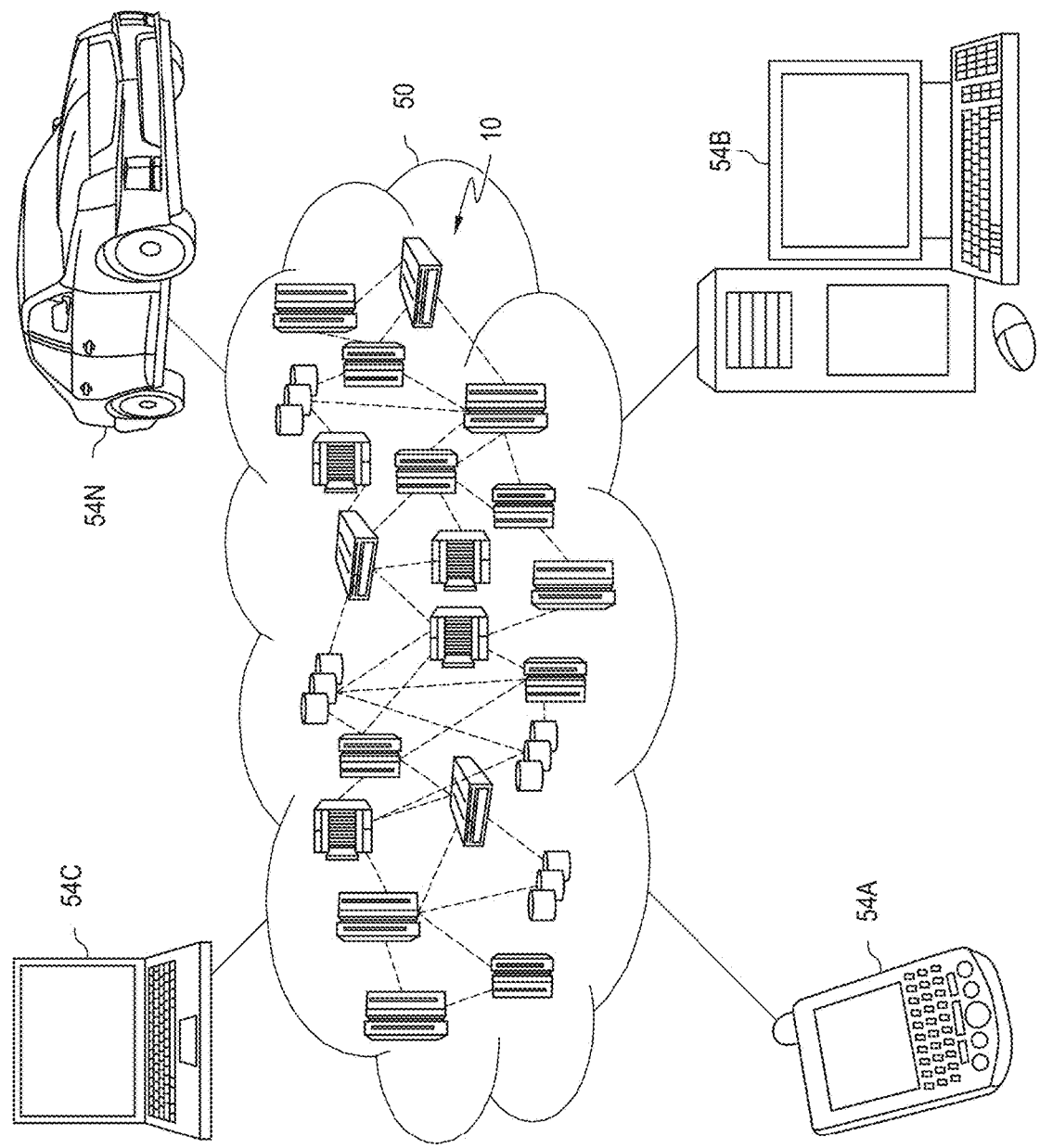
FIG. 2 depicts a cloud computing environment, consistent with some embodiments.

FIG. 2 illustrates a cloud environment containing one or more DPS 100, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a license compliance service 96.

LICENSE SCAN TRIGGERING SYSTEM

Figure 4:
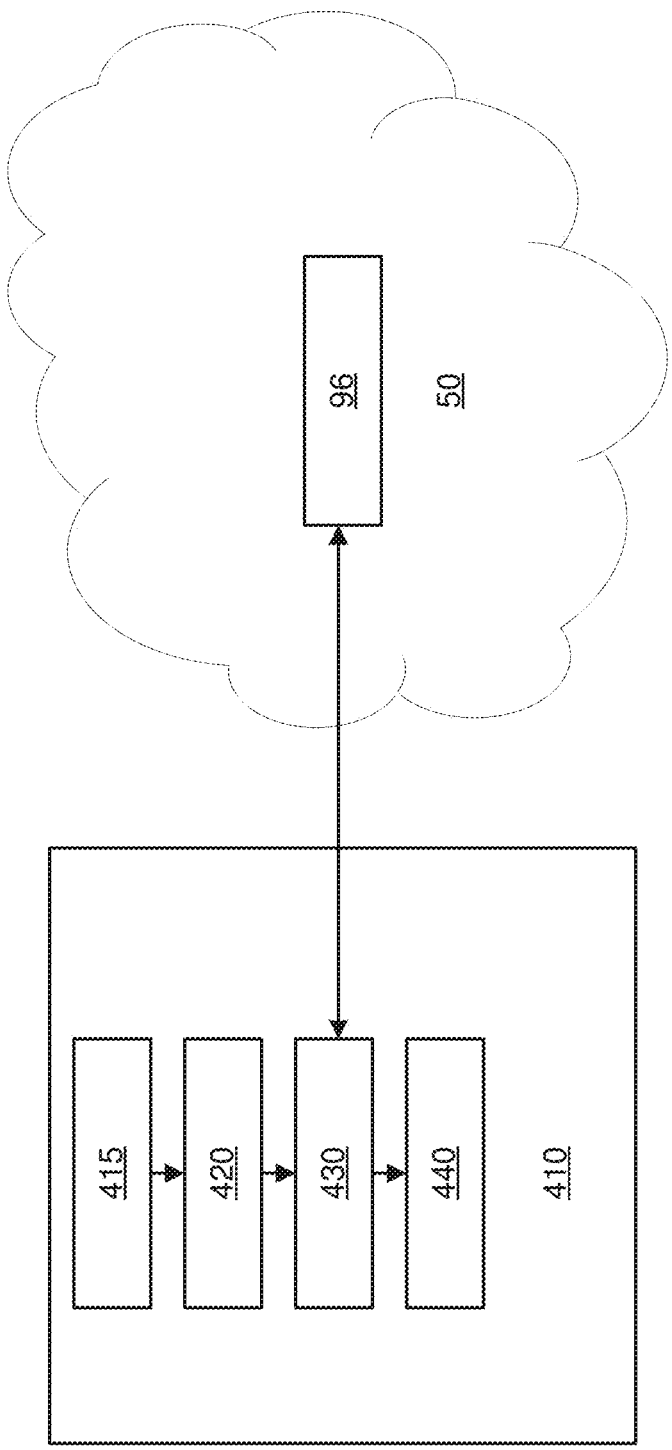
FIG. 4 is a system diagram of a lightweight license scan triggering system, consistent with some embodiments.

FIG. 4 is a system diagram of a light-weight license scan triggering system 400, consistent with some embodiments. The embodiment in FIG. 4 comprises a target DPS 410, and a license compliance service 96 executing in cloud computing environment 50.

The target DPS 410 in some embodiments may be the DPS 100 described with reference to FIG. 1. The target DPS 410 may include a pre-installed monitoring system 415, such as an antivirus program or intrusion detection system distributed in binary-only form by an independent software provider, and a possible breach detection module 430. The monitoring system 415 may produce software logs 420, which may be analyzed by the possible breach detection module 430. The software logs 420 may include software change logs that indicate new software installation events e.g., new directories created in the "/opt" directory, files created in the "C:/program files" directory, etc. Additionally or alternatively, the software logs 420 may also include access control logs that indicate which users, and how many users, have access to the DPS 410 e.g., new user events.

The possible breach detection module 430 may comprise a machine learning model in some embodiments. The machine learning model may be trained to analyze the software logs 420, to calculate a license violation probability score indicative of, e.g., that a particular new software installation requires a license, and to determine whether the calculated license violation probability score is greater than a predetermined threshold. In other embodiments, the possible breach detection module 430 may comprise a risk assessment algorithm. The risk assessment algorithm may assign risk scores to various events (e.g., a new software package installation, different users accessing a software package, etc.), calculate a license violation probability score from the risk scores, and then compare the calculated license violation probability score to a predetermined threshold. In response to the license violation probability score probability being greater than the predetermined threshold, the possible breach detection module 430 may, in some embodiments, trigger a license scan notification. The license scan notification may be presented to the user as, for example, an email notification. The possible breach detection module 430 may also send the license scan notification to a license compliance service 96. One or both of these notifications may trigger a supplemental scan by a license compliance module 440. This supplemental scan may require significant computing resources and/or input from a primary user of the target DPS 410.

TRAINING PHASE

The machine learning model in some embodiments may be any software system that recognizes patterns. In some embodiments, the machine learning may comprise a plurality of artificial neurons interconnected through connection points called synapses. Each synapse may encode a strength of the connection between the output of one neuron and the input of another. The output of each neuron, in turn, may be determined by the aggregate input received from other neurons that are connected to it, and thus by the outputs of these "upstream" connected neurons and the strength of the connections as determined by the synaptic weights.

The ML models may be trained to solve a specific problem (e.g., event significance) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function.

In some embodiments, the artificial neurons may be organized into layers. The layer that receives external data is the input layer. The layer that produces the ultimate result is the output layer. Some embodiments include hidden layers between the input and output layers, and commonly hundreds of such hidden layers.

Figure 5:
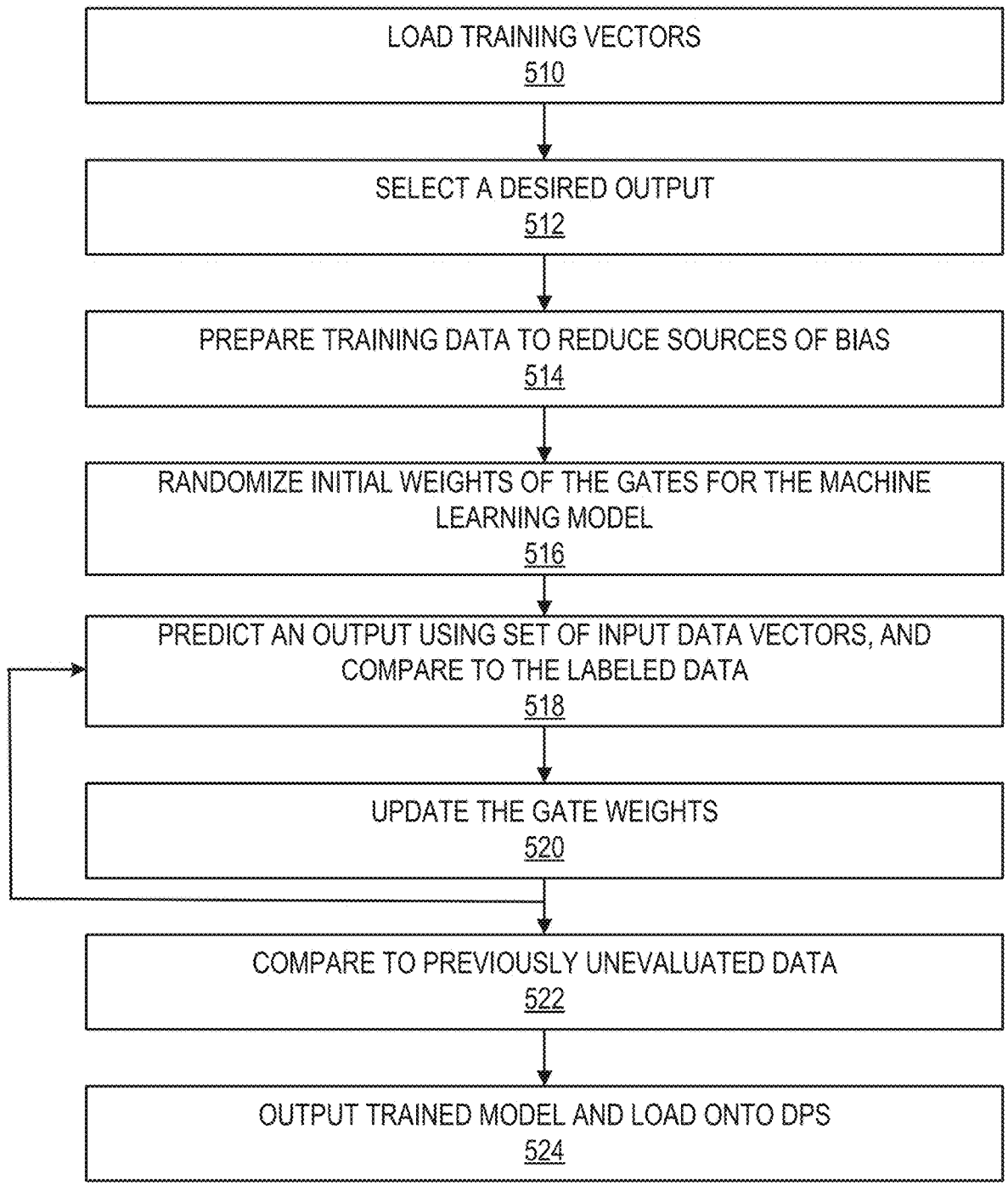
FIG. 5 is a flow chart illustrating one method of training a machine learning model for a possible breach detection module, consistent with some embodiments.

FIG. 5 is a flow chart illustrating one method 500 of training a machine learning model for the possible breach detection module 430, consistent with some embodiments. A system manager may begin by loading training vectors from a plurality of reports pairs from the monitoring system 415 and the license compliance module 440 at operation 510. This may include vectors in which the license compliance module 440 found there was a violation and vectors in which the license compliance module 440 did not find a violation.

At operation 512, the system manager may select a desired output (e.g., a list of events having a probability of violation above a predetermined threshold). At operation 514, the training data may be prepared to reduce sources of bias, typically including de-duplication, normalization, and order randomization. At operation 516, the initial weights of the gates for the machine learning model may be randomized. At operation 518, the ML model may be used to predict an output using set of input data vectors, and that prediction is compared to the labeled data. The error (e.g., the difference between the predicted value and the labeled data) is then used at operation 520 to update the gate weights. This process may repeat, with each iteration updating the weights, until the training data is exhausted, or the ML model reaches an acceptable level of accuracy and/or precision. At operation 522, the resulting model may optionally be compared to previously unevaluated data to validate and test its performance. At operation 524, the resulting model may be loaded onto a plurality of DPS 410 and used to analyze new software logs 420 on the client DPS 410.

ANALYSIS PHASE

Figure 6:
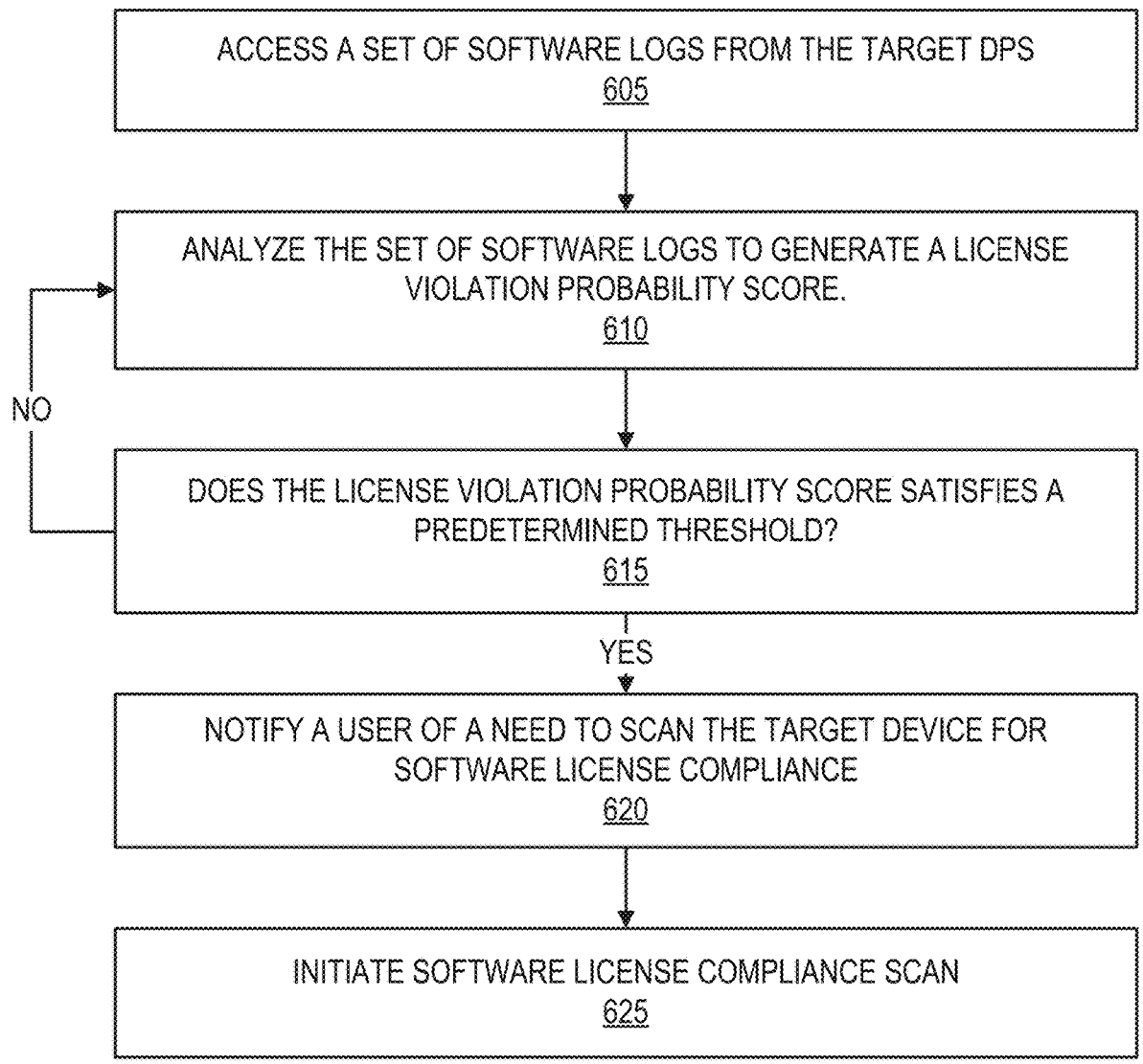
FIG. 6 is a flow chart illustrating the light-weight license scan triggering system in operation, consistent with some embodiments.

FIG. 6 is a flow chart illustrating the light-weight license scan triggering system 400 in operation, consistent with some embodiments. At operation 605, the light-weight license scan triggering system 400 may access a set of software logs from the target DPS 100. The software logs may have generated by one or more pre-installed, binary-only applications executing on the target DPS 100 (e.g., an antivirus program, a firewall, a software package manager, an intrusion detection system, etc.) At operation 610, the light-weight license scan triggering system 400 may analyze the set of software logs to generate a license violation probability score. In some embodiments, analyzing the set of software change logs may comprise identifying an action chosen from the group consisting of a new software installation, a software upgrade, a new user account, and a new directory creation within a local storage of the target device. The analyzing may also comprise inputting the set of software logs into machine learning model trained to identify possible license violations and/or may comprise assigning a risk score to each of a plurality of events in the software log. At operation 615, the light-weight license scan triggering system 400 may determine whether the license violation probability score satisfies (e.g., exceeds) a predetermined threshold. If so, then the light-weight license scan triggering system 400 may notify a user of a need to scan the target device for software license compliance. The user or system may then initiate scanning the target device for software license compliance at operation 620. This software license compliance scan may utilize a software package specially adapted for this purpose which, because it is only invoked in response to the license violation probability score satisfying the predetermined threshold, may utilize a comparatively large amount of computing resources.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A method for light-weight software license compliance management, comprising:
   accessing, by a first application, a set of software logs from a target device, wherein the set of software logs are pre-generated by one or more pre-installed applications on the target device including the first application and a second application, the set of software logs are an output log of the one or more pre-installed applications, and the set of software logs comprise a set of software change logs and the change logs indicate installation events for the second application;
   analyzing the set of software logs to generate a license violation probability score, wherein the analyzing comprises inputting the set of software logs into machine learning model trained to identify a possible license violation of a license for the second application;
   determining the license violation probability score satisfies a predetermined threshold; and
   notifying, in response to the determining, a user of a need to scan the target device for software license compliance of the second application.

2. The method of claim 1, wherein the one or more pre-installed applications comprises an antivirus program executing on the target device.

3. The method of claim 1, wherein the one or more pre-installed applications comprises the set of software change logs from an intrusion detection system executing on the target device.

4. The method of claim 1, wherein the analyzing of the set of software change logs comprises identifying an action chosen from the group consisting of a new software installation, a software upgrade, a new user account, and a new directory creation within a local storage of the target device.

5. The method of claim 1, further comprising training the machine learning model using a plurality of paired license scan results and the set of software logs.

6. The method of claim 1, wherein the analyzing comprises assigning a risk score to a plurality of events in the software log.

7. The method of claim 1, further comprising, scanning the target device for software license compliance in response to the notifying.

8. A computer program product for light-weight software license compliance management, the computer program product comprising a computer readable storage medium having program instructions embodied therewith, the program instructions executable by a processor to cause the processor to:
   access, by a first application, a set of software logs from a target device, wherein the set of software logs are pre-generated by one or more pre-installed applications on the target device including the first application and a second application, the set of software logs are an output of the one or more pre-installed applications, and the set of software logs comprise a set of software change logs and the change logs indicate installation events for the application;
   train a machine learning model to identify possible license violations using a plurality of paired license scan results and the set of software logs;
   analyze the set of software logs to generate a license violation probability score, wherein the analyzing comprises inputting the set of software change logs into the machine learning model, wherein the analysis comprises inputting the set of software logs into machine learning model trained to identify a possible license violation of a license for the second application;
   determine the license violation probability score satisfies a predetermined threshold;
   notify, in response to the determination the license violation probability score satisfies the predetermined threshold, a user of a need to scan the target device for software license compliance of the second application; and
   scan the target device for software license compliance in response to the notifying.

9. A system for light-weight software license compliance management, the system comprising a processor, wherein the processor comprises a microprocessor, and the processor is configured to execute instructions that, when executed on the processor, cause the processor to:
   access, by a first application, a set of software logs from a target device, wherein the set of software logs are pre-generated by one or more pre-installed applications on the target device including the first application and a second application, the set of software logs comprise a set of software change logs, and the change logs indicate installation events for the application;
   analyze the set of software logs to generate a license violation probability score, wherein the analysis comprises inputting the set of software logs into machine learning model trained to identify a possible license violation of a license for the second application;
   determine the license violation probability score satisfies a predetermined threshold; and
   notify, in response to the determination the license violation probability score satisfies the predetermined threshold, a user of a need to scan the target device for software license compliance of the second application.

10. The system of claim 9, wherein the one or more pre-installed applications comprises an antivirus program executing on the target device.

11. The system of claim 9, wherein the one or more pre-installed applications comprises the set of software change logs from an intrusion detection system executing on the target device.

12. The system of claim 9, wherein the analyzing of the set of software change logs comprises identifying an action chosen from the group consisting of a new software installation, a software upgrade, a new user account, and a new directory creation within a local storage of the target device.

13. The system of claim 9, further comprising instructions that, when executed on the processor, cause the processor to train the machine learning model using a plurality of paired license scan results and the set of software logs.

14. The system of claim 9, further comprising instructions that, when executed on the processor, cause the processor to scan the target device for software license compliance in response to the notifying.

\* \* \* \* \*